(12) United States Patent
Okabe et al.

(10) Patent No.: US 8,385,741 B2
(45) Date of Patent: Feb. 26, 2013

(54) OPTICAL PULSE GENERATING DEVICE AND OPTICAL SIGNAL PROCESSING DEVICE

(75) Inventors: Ryou Okabe, Kawasaki (JP); Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 112 days.

(21) Appl. No.: 12/732,523

(22) Filed: Mar. 26, 2010

(65) Prior Publication Data

US 2010/0183303 A1    Jul. 22, 2010

Related U.S. Application Data

(63) Continuation of application No. PCT/JP2007/069885, filed on Oct. 11, 2007.

(51) Int. Cl.
*H04J 14/06* (2006.01)
*H04J 14/02* (2006.01)
*H04B 10/00* (2006.01)

(52) U.S. Cl. .............................. 398/65; 398/91; 398/152

(58) Field of Classification Search .................... 398/65, 398/81, 82, 91, 142, 147, 152, 157
See application file for complete search history.

(56) References Cited

U.S. PATENT DOCUMENTS

| | | | |
|---|---|---|---|
| 5,535,001 A | 7/1996 | Tajima | |
| 5,892,608 A | 4/1999 | Suzuki et al. | |
| 6,448,913 B1 * | 9/2002 | Prucnal et al. | 341/137 |
| 6,477,300 B2 * | 11/2002 | Watanabe et al. | 385/42 |
| 6,853,774 B2 * | 2/2005 | Watanabe | 385/39 |
| 6,987,607 B2 * | 1/2006 | Watanabe | 359/332 |
| 7,577,357 B2 * | 8/2009 | Arahira | 398/45 |
| 2002/0105706 A1 | 8/2002 | Ueno | |
| 2004/0190101 A1 | 9/2004 | Hayashi et al. | |
| 2005/0111854 A1 | 5/2005 | Miyazaki | |
| 2005/0180758 A1 * | 8/2005 | Seguineau et al. | 398/175 |
| 2006/0045445 A1 * | 3/2006 | Watanabe | 385/122 |
| 2006/0051100 A1 | 3/2006 | Watanabe | |

FOREIGN PATENT DOCUMENTS

| | | |
|---|---|---|
| JP | 04-025821 | 1/1992 |
| JP | 05-281585 | 10/1993 |
| JP | 7-20510 | 1/1995 |
| JP | 7-199241 | 8/1995 |
| JP | 07-221706 | 8/1995 |
| JP | 08-008821 | 1/1996 |
| JP | 2002-229081 | 8/2002 |
| JP | 2004-297582 | 10/2004 |
| JP | 2005-159389 | 6/2005 |
| JP | 2006-084797 | 3/2006 |
| JP | 2007-133426 | 5/2007 |

OTHER PUBLICATIONS

International Preliminary Report on Patentability, mailed May 20, 2010, in corresponding PCT Application No. PCT/JP2007/069885 (5 pp.).

Hirooka, T. et al., *A New Adaptive Equalization Scheme for a 160-Gb/s Transmitted Signal Using Time-Domain Optical Fourier Transformation*, IEEE Photonics Technology Letters, vol. 16, No. 10, Oct. 2004, pp. 2371-2373.

(Continued)

*Primary Examiner* — Dalzid Singh
(74) *Attorney, Agent, or Firm* — Staas & Halsey LLP

(57) ABSTRACT

An optical pulse generating device includes a continuous light input unit to which continuous light is input; a pulse input unit to which control pulse light that includes periodic pulses of light is input; and a generating unit that generates pulse light from the continuous light by clipping the continuous light according to a variation of emission intensity of the control pulse light.

11 Claims, 13 Drawing Sheets

OTHER PUBLICATIONS

Inoue, T. et al., *Generation of 160-GHz sub-picosecond in-phase pulse train from optical beat signal*, Fitel Photonics Laboratory (3 pp.).

Schubert, C. et al., 160 Gbit/s wavelength converter with 3R-regenerating capability, Electronics Letters, vol. 38, No. 16, Aug. 1, 2002, pp. 903-904.

Parmigiani, F. et al., *Pulse Retiming Based on XPM Using Parabolic Pulses Formed in a Fiber Bragg Grating*, IEEE Photonics Technology Letters, vol. 18, No. 7, Apr. 1, 2006, pp. 829-831.

Petopoulus, P. et al., Rectangular Pulse Generation Based on Pulse Reshaping Using a Superstructured Fiber Bragg Grating, Journal of Lightwave Technology, vol. 19, No. 5, May 2001, pp. 746-752.

International Search Report, mailed Nov. 13, 2007, in corresponding International Application No. PCT/JP2007/069885 (1 pg.).

Form PCT/ISA/210 from corresponding International Application No. PCT/JP2007/069885 (2 pp.).

Form PCT/ISA/220 from corresponding International Application No. PCT/JP2007/069885 (1 pg.).

Form PCT/ISA/237 from corresponding International Application No. PCT/JP2007/069885 (3 pp.).

International Preliminary Report on Patentability, mailed Apr. 22, 2010, in corresponding International Application No. PCT/JP2007/069885 (5 pp.).

Japanese Office Action for corresponding Japanese Application 2009-536897; mailed Jul. 3, 2012.

Japanese Notice of Rejection mailed Nov. 27, 2012 in Japanese Application No. 2009-536897.

\* cited by examiner

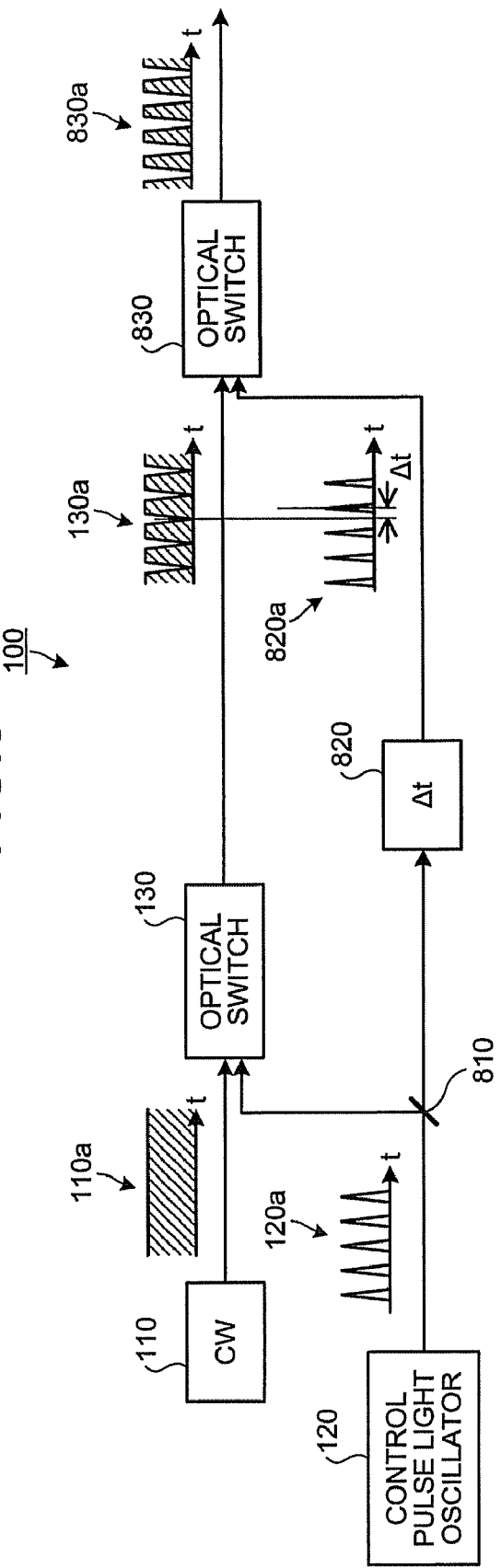

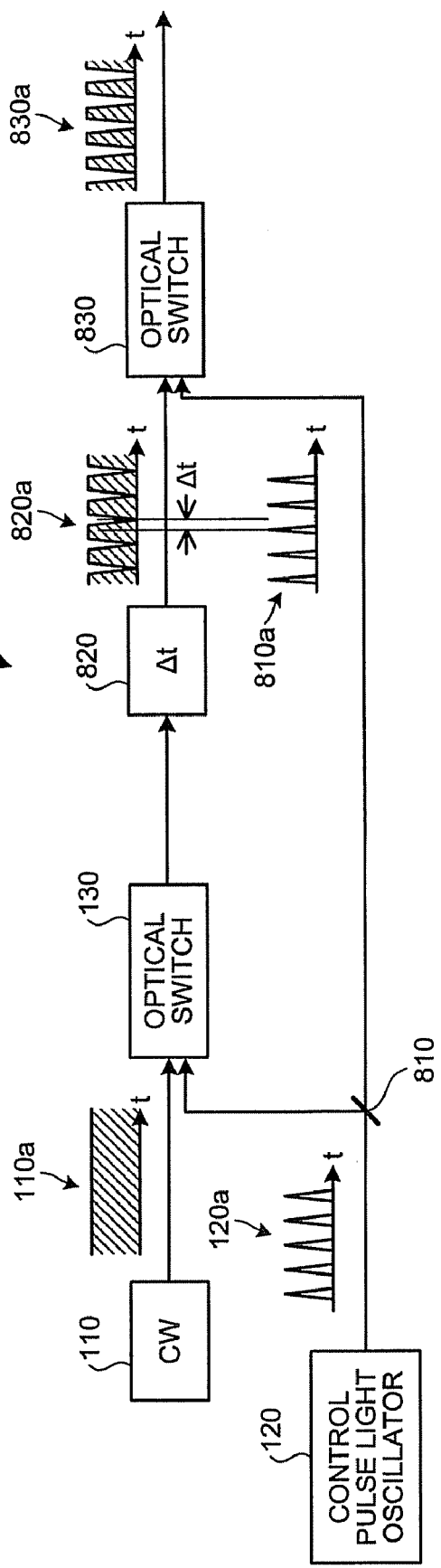

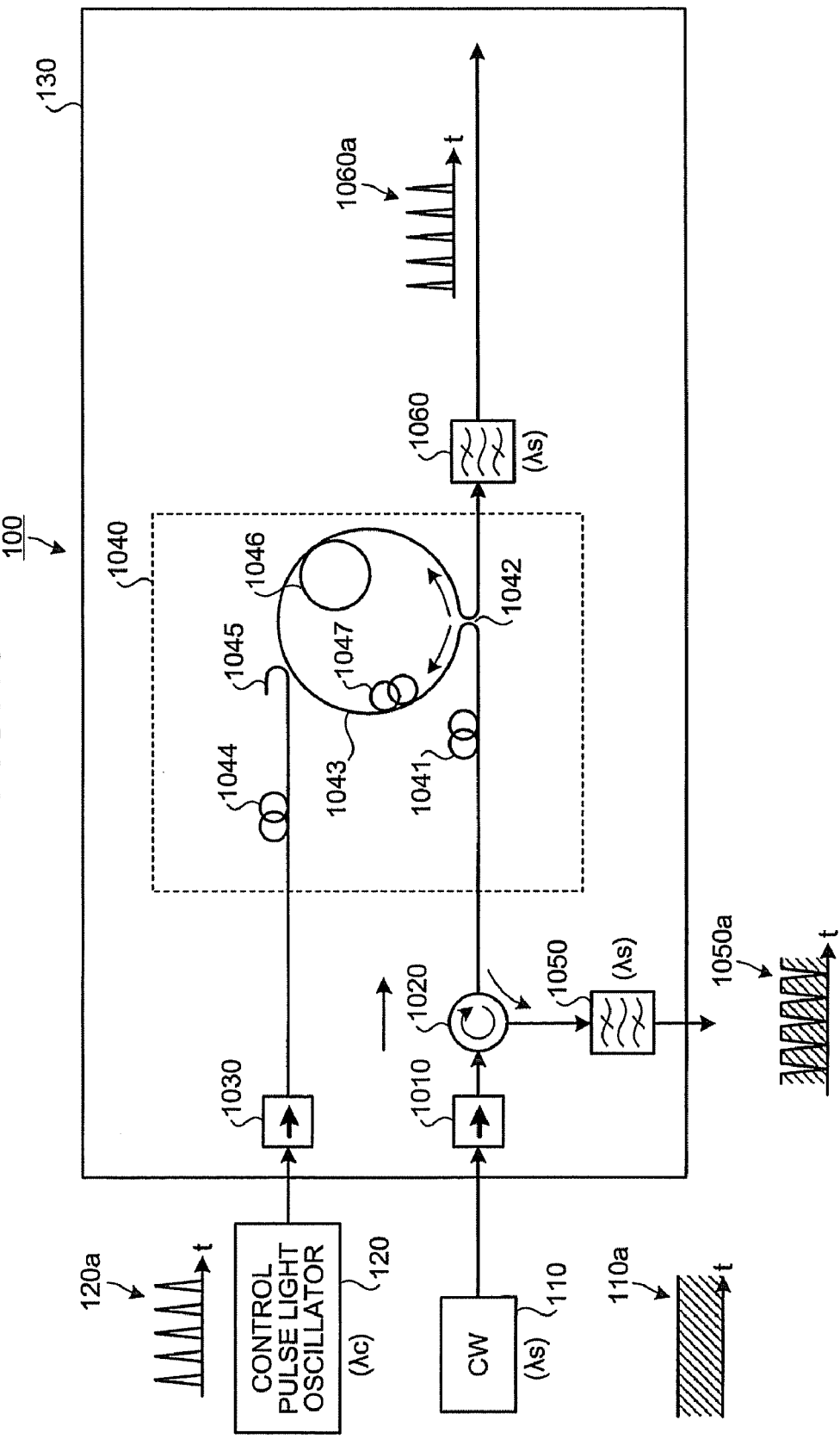

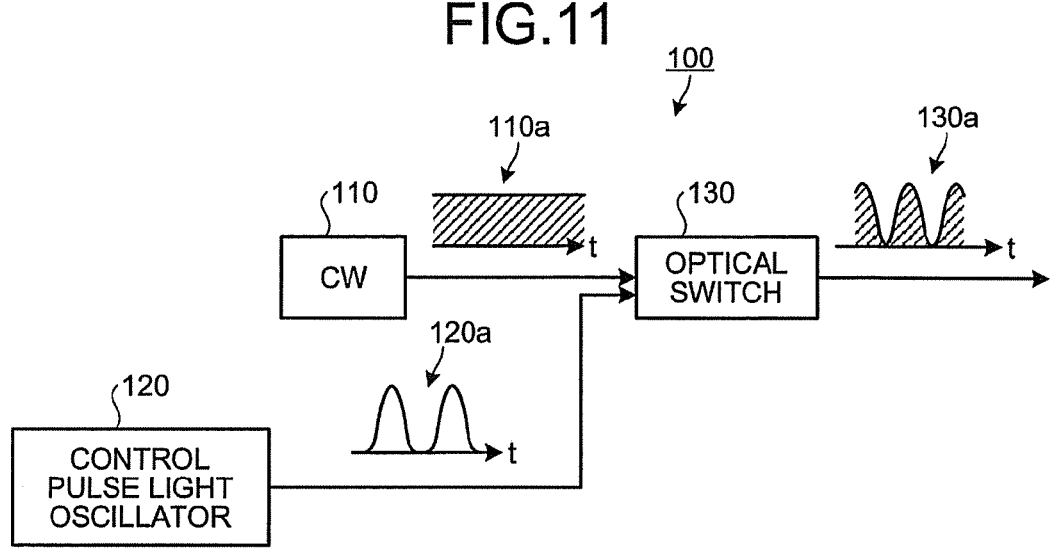
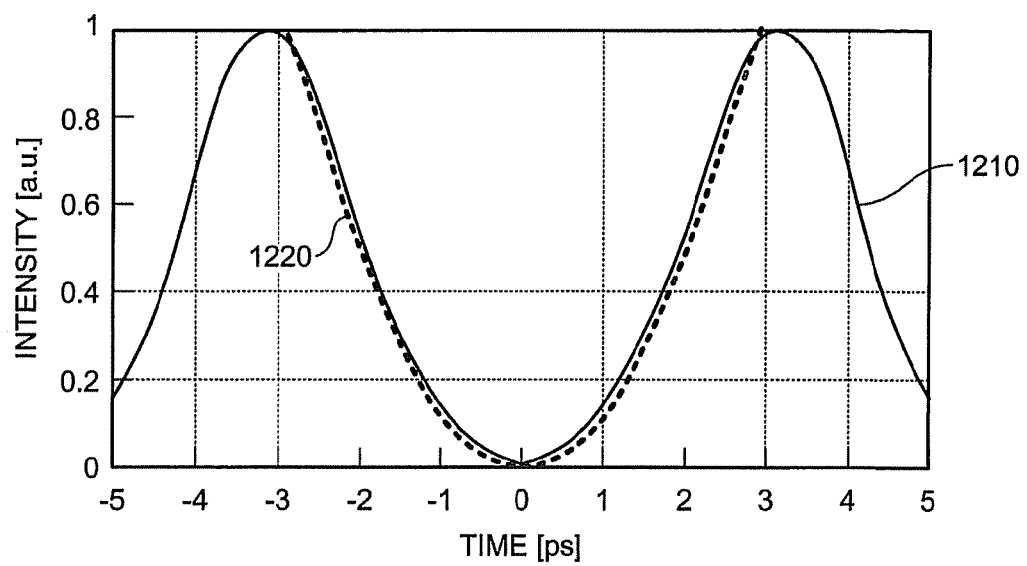

OPTICAL PULSE GENERATING DEVICE AND OPTICAL SIGNAL PROCESSING DEVICE

This application is a continuation of International Application No. PCT/JP2007/069885, filed Oct. 11, 2007, the disclosure of which is herein incorporated in its entirety by reference.

FIELD

The embodiments discussed herein are related to an optical pulse generating device and an optical signal processing device that generate an optical pulse.

BACKGROUND

The traffic on optical-fiber communication networks that serve the Internet-oriented society of recent years continues to increase year after year, and now the bit rate of commercial wavelength-division-multiplexing (WDM) communication devices has reached 40 Gb/s. IEEE 802.3 is standardizing a capacity of 100 Gb/s as a next-generation fast Ethernet. ITU-T SG15 has started studying accommodation schemes for optical transport networks (OTN) of 100 GbE, and is actively researching and developing optical fiber transmission using fast signal light on the order of 100 Gb/s.

Generally, such a super-fast signal is generated by optical time-division-multiplexing (OTDM) short pulses of about several picoseconds. Since electrical signal processing cannot keep up with such a super-fast signal, all-optical signal processing, in which an optical signal is processed as it is without being converted into an electrical signal, is under research. The speed of the electrical signal processing has improved recently, however, the limit is anticipated to be about 100 GHz.

As one elementary technology for all-optical signal processing, an optical switch that operates at very high speed is important. For example, to monitor the quality of the super-fast signal, the symbol error rate has to be measured and the optical waveform has to be observed. In this case, since current technology depends on electrical signal processing, the bit rate has to be reduced by time-division-demultiplexing the super-fast signal to a speed that the electrical signal processing can keep pace with.

An ultra high-speed optical switch is not only used for such relatively-simple time-division-demultiplexing, but also is expected to be used as an all-optical 2R regenerator or 3R regenerator that restore signal quality that has been deteriorated by noise of the optical fiber transmission path, the optical amplifier, etc. The 2R regeneration means reamplification and reshaping, and the 3R regeneration means reamplification, reshaping, and retiming.

Such an ultra high-speed optical switch is not feasible yet, however, several schemes have been suggested. Here, the ultra high-speed optical switch means an optical AND gate. Particularly, an optical fiber switch can operate at very high speed since the optical fiber switch uses a nonlinear optical effect of an optical fiber responding within about femtosecond, and has a low insertion loss and high efficiency. Thus, the optical fiber switch is a promising optical switch for practical use.

As an optical fiber switch, various kinds of devices are known such as an optical Kerr switch using cross phase modulation (XPM), a nonlinear optical loop mirror (NOLM), a phase conjugator using four wave mixing (FWM), a wavelength converter, a parametric amplifier, and a parametric amplification switch, etc.

In an optical switch using a nonlinear optical effect, an optical pulse that can achieve a higher peak power than continuous light and can cause the nonlinear optical effect efficiently is used as control light. Not limited to the optical AND gate, nonlinear optical effects are used variously in the field of all-optical signal processing, such as a wavelength converter using self phase modulation (SPM), pulse compression, etc.

Related to the optical signal processing, a technology for generating a flat-top optical pulse or an optical pulse of quadratic shape has been disclosed. For example, a technology for generating an optical pulse using the birefringence of a polarization maintaining fiber (PMF) has been disclosed (PMF method; see, for example, Schubert, C., et al, "160 Gbit/s wavelength converter with 3R-regenerating capability," Electronics Letters, Volume 38, Issue 16, 1 Aug. 2002, Pages 903-904).

An optical signal processing device that generates an optical pulse by PMF method is configured with, for example, a PMF and a polarizer. Light is input to the PMF at an orientation at which the power of the optical pulses is equally distributed to the fast axis (x axis) and the slow axis (y axis) having different refractive indices, that is, at an orientation shifted from the x axis by 45 degrees. In the PMF, the propagation speeds of the optical pulses along the axes are different.

Thus, optical pulses that have propagated through the PMF exhibit differences in arrival time (differential group delay). A pulse wider than the input optical pulse can be obtained by extracting a polarization component from an optical pulse that has propagated through the PMF by the polarizer at the orientation shifted from the x axis by 45 degrees. A flat-top optical pulse can be obtained by adjusting the width of the optical pulse and the differential group delay of the PMF.

An optical signal processing device that generates an optical pulse by slicing the optical spectrum by a fiber bragg grating (FBG) has been disclosed (FBG method; see, for example, Petropoulos, P., et al, "Rectangular Pulse Generation Based on Pulse Reshaping Using a Superstructured Fiber Bragg Grating," JOURNAL OF LIGHTWAVE TECHNOLOGY, VOL. 19, No. 5, MAY 2001). The FBG method is a method of reshaping the optical pulse by reshaping the optical spectrum that is Fourier transform components of the optical pulse.

A flat-top optical pulse can be obtained by designing the shape of the reflection band of the FBG to be the shape resulting from Fourier transform of the flat-top optical pulse and by slicing the optical spectrum by the FBG. A parabolic optical pulse of quadratic shape can be obtained also by designing the reflection band of the FBG to be a quadratic (parabola) shape.

Related to optical signal processing, a scheme called optical Fourier transform has been suggested as a measure of restoring the quality of signal light (see, for example, Hirooka, Toshihiko, et al, "A New Adaptive Equalization Scheme for a 160-Gb/s Transmitted Signal Using Time-Domain Optical Fourier Transformation," IEEE, IEEE PHOTONICS TECHNOLOGY LETTERS, VOL. 16, No. 10, OCTOBER 2004, Pages 2371-2373). The optical Fourier transform is a method of converting, by a phase modulator and a dispersion medium, the waveform of an optical pulse to the optical spectrum that is Fourier transform components of the optical pulse and vice versa. Even if the waveform of the optical pulse is distorted due to dispersion, dispersion slope, or polarization mode dispersion, etc., the waveform of the optical pulse can be restored by the optical Fourier transform as long as the shape of the optical spectrum is maintained.

The optical Fourier transform achieves efficient regeneration by multiplying phase modulation for quadratic shape in synchronization with the optical pulse. An optical signal processing device that performs a conventional optical Fourier transform is implemented by a phase modulator using, for example, LiNbO$_3$. Further, another technology for generating an optical pulse of quadratic shape has been disclosed (see, for example, Parmigiani, F., et al, "Pulse Retiming Based on XPM Using Parabolic Pulses Formed in a Fiber Bragg Grating," IEEE PHOTONICS TECHNOLOGY LETTERS, VOL. 18, No. 7, APRIL 1, 2006).

However, the characteristics of the signal light output from a conventional optical switch using the nonlinear optical effect described above strongly depend on the characteristics of the control light input to the optical switch. Thus, if phase noise is included in the signal light or the control light, intensity noise is generated in the signal light output from the optical switch. This problem is explained in detail below.

SPM and XPM are phase modulation (frequency chirp) generated in nonlinear medium such as an optical fiber. SPM is frequency chirp induced by the light wave of the signal light itself, while XPM is frequency chirp induced by the light wave of other wave(s) (control light). The frequency chirp induced by SPM is represented by a time differential $d\phi_{SPM}/dt$ of the phase shift $\phi_{SPM}$ induced by SPM.

The frequency chirp induced by XPM is represented by the time differential $d\phi_{XPM}/dt$ of the phase shift $\phi_{XPM}$ induced by XPM. The frequency chirp $d\phi_{SPM}/dt$ induced by SPM and the frequency chirp $d\phi_{XPM}/dt$ induced by XPM are represented by the equations (1) and (2) below, where the length of the highly nonlinear fiber is L (km), the optical power of the electric field is $P_1$, $P_2$ (W), and the nonlinear coefficient of the highly nonlinear fiber is $\gamma$(W$^{-1}$km$^{-1}$).

$$\frac{d\varphi_{SPM}}{dt} = \gamma \times L \times \frac{dP_1}{dt} \quad (1)$$

$$\frac{d\varphi_{XPM}}{dt} = 2 \times \gamma \times L \times \frac{dP_2}{dt} \quad (2)$$

The nonlinear coefficient $\gamma$ of equations (1) and (2) above is represented by the equation (3) below, where the nonlinear refractive index of the highly nonlinear fiber is $n_2$, the effective core cross-sectional area of the highly nonlinear fiber is $A_{eff}$, and the wavelength of the signal light is $\lambda$.

$$\gamma = \frac{2\pi n_2}{\lambda A_{eff}} \quad (3)$$

As indicated by equations (1) and (2) above, the frequency chirp induced by SPM or XPM is proportional to the time differential $dP_n/dt$ of the optical power (n=1 or 2). Thus, the characteristics of the signal light output from the optical switch using a nonlinear optical effect strongly depend on the characteristics of the control light input to the optical switch. For example, when the optical pulse has a quadratic shape, linear frequency chirp proportional to time can be provided to the signal light output from the optical switch.

FWM is a phenomenon that, when a control light $\lambda$c having the same wavelength as the zero-dispersion wavelength $\lambda_0$ of the optical fiber and a signal light $\lambda$s having a different wavelength from the control light are both input to the optical fiber, a third light (idler) is generated. In this phenomenon, a gain of the same power as the idler is generated for the signal light. This is called parametric amplification. The generation efficiency $\eta$ of FWM is represented by the equation (4) below, where the loss of the nonlinear fiber is $\alpha$, and the power of the control light at the input to the optical fiber is Pc.

$$\eta = \exp(-\alpha \times z) \times (\ominus \times Pc \times L(z))^2 \quad (4)$$

L(z) of equation (4) above is represented by the equation (5) cited below, where the length of the nonlinear optical fiber is z.

$$L(z) = \frac{1 - \exp(-\alpha z)}{\alpha} \quad (5)$$

In equation (5) above, L=z when the loss of the optical fiber can be disregarded ($\alpha$=0). Thus, in equation (4) above, the generation efficiency $\eta$ of FWM is proportional to the square of the optical power Pc when $\gamma \times Pc \times z$ is sufficiently large and the loss of the optical fiber can be disregarded. As a result, when the light wave is an optical pulse, the generation efficiency of FWM differs according to the position of the waveform of the optical pulse. Thus, in the optical switch using a nonlinear optical effect, the generated nonlinear optical effect depends on the shape of the optical pulse in principle.

FIG. 18 is a diagram for explaining the operation of a conventional optical switch. In FIG. 18, signal light 1810 represents signal light input to an optical switch 1830. An optical pulse 1820 represents an optical pulse input to the optical switch 1830 as control light. The optical switch 1830 is an optical switch using a nonlinear optical effect described above. Here, an example is described in which the signal light 1810 includes phase noise.

The nonlinear optical effect is generated only when the signal light 1810 and the control light 1820 that are input to the optical switch 1830 functioning as an optical AND gate are overlapped with each other temporally. When the signal light 1810 includes phase noise, since the optical pulse 1820 has peaks, the timings of the signal light 1810 and the peaks of the optical pulse 1820 do not match, thereby causing intensity noise 1850 on an output signal 1840 of the optical switch 1830.

It is known that phase noise is not only caused by the light source itself, but also is accumulated by propagation through optical fibers and/or repeated reamplification by optical amplifiers. Further, in the optical fiber housed in the ultra high-speed optical switch, loss in temporal overlap (walk off) is caused between the signal light 1810 and the control light 1820 due to wavelength dispersion, which is one of the causes of a reduced efficiency of the nonlinear optical effect and a limited operation band.

To cope with the above problem, the generation of intensity noise in the output signal 1840 can be prevented by reshaping the signal light 1810 or the control light 1820 input to the optical switch 1830 to have a flat-top shape. For example, a pulse waveform close to the flat-top shape can be obtained by changing the bias point of the input electrical signal by a light source with an intensity modulator. However, the pulse width that can be achieved by this method is on the order of several tens of picoseconds, and thus an optical pulse applicable to 100 Gb/s or more cannot be generated.

The method according to Schubert, C., et al, "160 Gbit/s wavelength converter with 3R-regenerating capability" strongly depends on the angle of input to the PMF, and the adjustment and the retention of settings are difficult. Further, in principle, a large insertion loss of 3 dB or more is generated. Furthermore, when an optical pulse including intensity noise is reshaped, a flat-top optical pulse inevitably including intensity noise is generated.

The method according to Petropoulos, P., et al, "Rectangular Pulse Generation Based on Pulse Reshaping Using a Superstructured Fiber Bragg Grating" has a limitation on the input/output optical pulse width. Further, in principle, the phase of the optical pulse is affected. Furthermore, when an optical pulse including intensity noise is reshaped, a flat-top optical pulse inevitably including intensity noise is generated. In addition, the methods according to Petropoulos, P., et al, "Rectangular Pulse Generation Based on Pulse Reshaping Using a Superstructured Fiber Bragg Grating" and Parmigiani, F., et al, "Pulse Retiming Based on XPM Using Parabolic Pulses Formed in a Fiber Bragg Grating" use an FBG corresponding to each wavelength, and thus cannot adapt to an optical pulse of an arbitral wavelength.

The method according to Hirooka, Toshihiko, et al, "A New Adaptive Equalization Scheme for a 160-Gb/s Transmitted Signal Using Time-Domain Optical Fourier Transformation" performs phase modulation by electrical signal processing. Thus, the bit rate of the signal light has to be reduced to about 10 Gb/s to perform Fourier transform on super-fast signal light of, for example, 100 Gb/s or more. As a result, the bit rate has to be changed again when the regenerated signal light is transmitted.

An optical pulse generating device and an optical signal processing device disclosed herein solve the above problems, and aim to generate a fast and low-noise optical pulse.

SUMMARY

According to an aspect of an embodiment, an optical pulse generating device includes a continuous light input unit to which continuous light is input; a pulse input unit to which control pulse light that includes periodic pulses of light is input; and a generating unit that generates pulse light from the continuous light by clipping the continuous light according to a variation of emission intensity of the control pulse light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a block diagram depicting a configuration of an optical pulse generating device according to a second embodiment.

FIG. 9 is a block diagram of a variation of the optical pulse generating device according to the second embodiment.

FIG. 10 is a block diagram depicting a configuration of an optical pulse generating device according to a third embodiment.

FIG. 11 is a block diagram depicting a configuration of an optical pulse generating device according to a fourth embodiment.

FIG. 12 is a wave diagram of generated pulse light having optical pulses of quadratic shape.

DESCRIPTION OF EMBODIMENTS

Preferred embodiments of the present invention will be explained with reference to the accompanying drawings.

Figure 1:
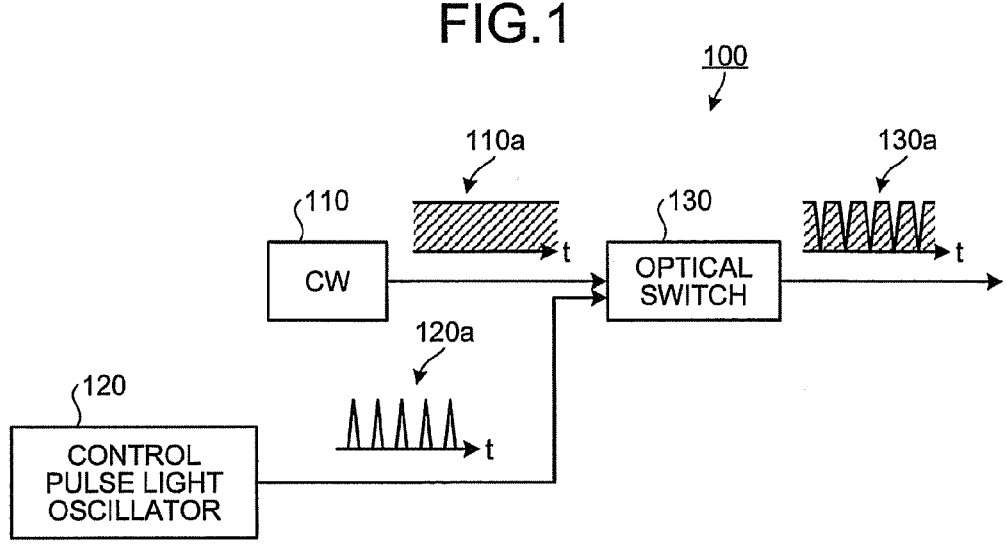
FIG. 1 is a block diagram depicting a configuration of an optical pulse generating device according to a first embodiment.

FIG. 1 is a block diagram depicting a configuration of an optical pulse generating device according to a first embodiment. As depicted in FIG. 1, an optical pulse generating device 100 according to the first embodiment includes a light source 110 (continuous wave (CW)), a control pulse light oscillator 120, and an optical switch 130. The light source 110 oscillates, and outputs a continuous light to the optical switch 130. A waveform 110a represents the waveform of the continuous light output from the light source 110.

The control pulse light oscillator 120 oscillates control pulse light that is periodic pulses of light. The control pulse light oscillator 120 outputs the oscillated control pulse light to the optical switch 130. The control pulse light oscillated by the control pulse light oscillator 120 is light of a different wavelength from that of the continuous light oscillated by the light source 110. Here, it is assumed that the wavelength of the continuous light oscillated by the light source 110 is $\lambda s$, and the wavelength of the control pulse light oscillated by the control pulse light oscillator 120 is $\lambda c$ ($\lambda s<\lambda c$).

A waveform 120a represents the waveform of the control pulse light output from the control pulse light oscillator 120. Here, as indicated by the waveform 120a, the control pulse light oscillated by and output from the control pulse light oscillator 120 includes periodic and instantaneous short pulses of light. Periodic and instantaneous short pulses of light are optical pulses that have a short emission period between periods of no-emission.

The optical switch 130 includes a continuous light input unit to which the continuous light output from the light source 110 is input and a pulse input unit to which the control pulse light output from the control pulse light oscillator 120 is input. The optical switch 130 is a generating unit that generates pulse light from the continuous light by clipping, from the continuous light, the component corresponding to a variation in the emission intensity of the control pulse light.

The optical switch 130 outputs generated pulse light to an external destination. A waveform 130a is the waveform of the pulse light output from the optical switch 130. Here, since the control pulse light output from the control pulse light oscillator 120 is short pulse light, the pulse light generated by and output from the generating unit is flat-top optical pulses as indicated by the waveform 130a.

Figure 2:
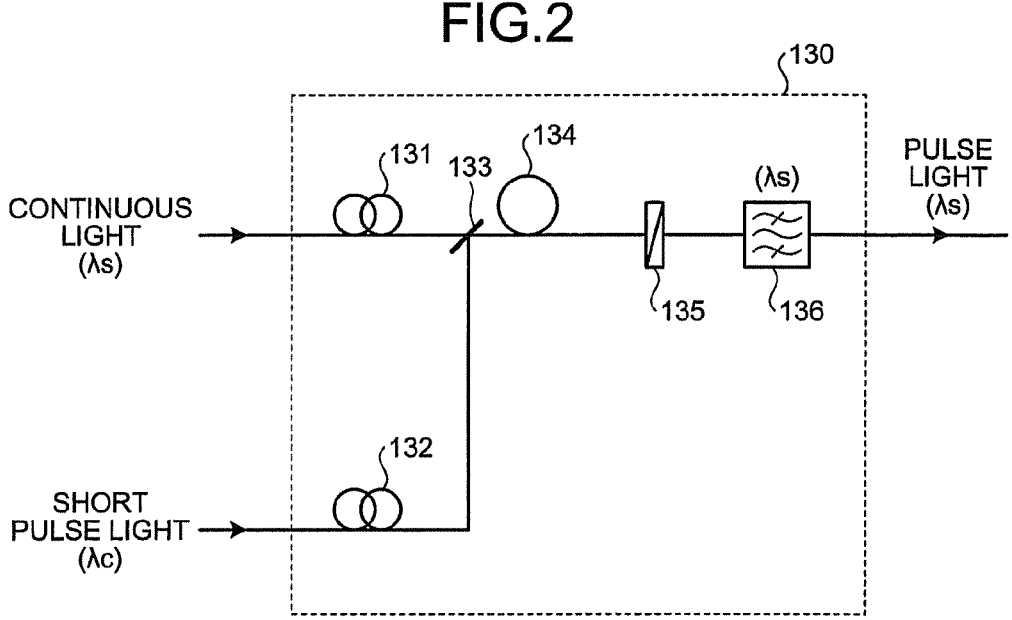
FIG. 2 is a block diagram of an example of a configuration of an optical switch.

FIG. 2 is a block diagram of an example of a configuration of the optical switch. As depicted in FIG. 2, the optical switch 130 of the optical pulse generating device 100 according to the first embodiment is an optical Kerr switch that includes a polarization controller 131, a polarization controller 132, an optical coupler 133, a highly nonlinear fiber 134, a polarizer 135, and a wavelength filter 136.

The polarization controller 131 controls the continuous light output from the light source 110 to be a given polarization (the transmission direction of the polarizer 135 described below). The polarization controller 131 outputs the continuous light of which polarization is controlled to the optical coupler 133. The polarization controller 132 controls the short pulse light output from the control pulse light oscillator 120 to be a polarization shifted 45 degrees from the given polarization described above. The polarization controller 132 outputs the short pulse light of which polarization is controlled to the optical coupler 133.

Thus, the polarizations of the continuous light and the short pulse light that are output to the optical coupler 133 become shifted by 45 degrees relative to each other. The optical coupler 133 combines the continuous light output from the polarization controller 131 and the short pulse light output from the polarization controller 132. The optical coupler 133 outputs the combined light including the continuous light and the short pulse light to the highly nonlinear fiber 134.

The highly nonlinear fiber 134 is an optical fiber of which the nonlinear coefficient is enhanced about 10 times as much as that of a general single-mode optical fiber. The highly nonlinear fiber 134 transmits and outputs the combined light output from the optical coupler 133, to the polarizer 135. From the combined light output from the highly nonlinear fiber 134, the polarizer 135 transmits only the component of the given polarization described above, and blocks components of other polarizations. The polarizer 135 outputs the transmitted component of the combined light to the wavelength filter 136.

The wavelength filter 136 transmits the component of the wavelength λs of the combined light output from the polarizer 135, and blocks the component of the wavelength λc. By the wavelength filter 136, the component corresponding to the short pulse light is eliminated from the combined light output from the polarizer 135, and the component corresponding to the continuous light is extracted. The details of the operation of the optical switch 130 are described below.

Figure 3:
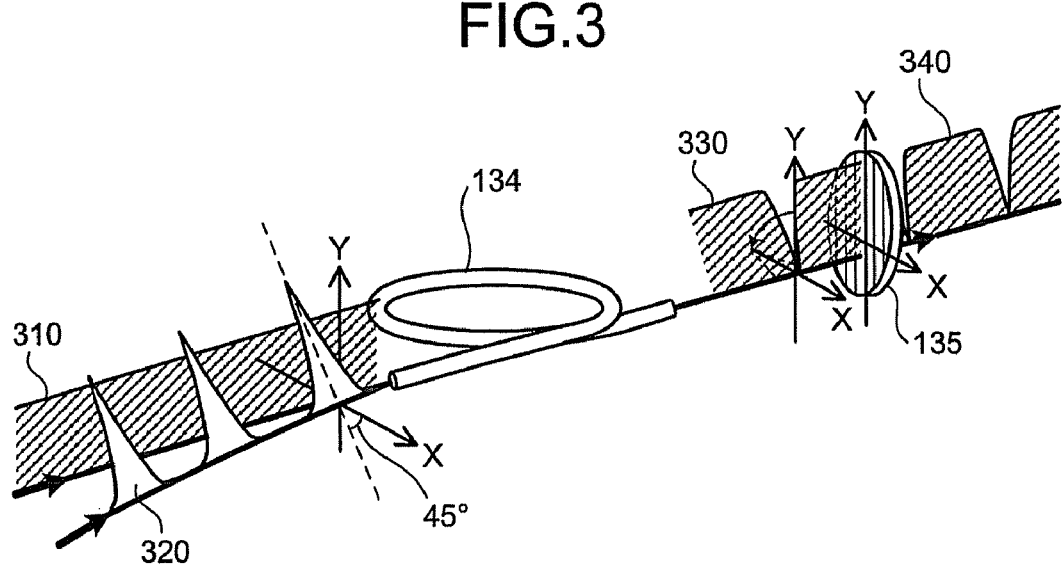
FIG. 3 is a diagram for explaining the operation of the optical switch.

FIG. 3 is a diagram for explaining the operation of the optical switch. In FIG. 3, continuous light 310 represents the continuous light input to the highly nonlinear fiber 134. Short pulse light 320 represents the short pulse light input to the highly nonlinear fiber 134. The continuous light 310 is input to the highly nonlinear fiber 134 such that the polarization state is parallel to the transmission direction of the polarizer 135 (Y axis of the figure).

The short pulse light 320 is input to the highly nonlinear fiber 134 such that the polarization state is shifted by 45 degrees relative to the continuous light 310. Combined light 330 represents the combined light that includes the continuous light 310 and the short pulse light 320 and that has passed through the highly nonlinear fiber 134. The polarization of the combined light 330 is rotated according to the variation of emission intensity of the short pulse light 320 that is input to the highly nonlinear fiber 134.

For example, when no optical pulse of the short pulse light 320 input to the highly nonlinear fiber 134 is in is in a state of being emitted, the polarization of the combined light 330 does not change from the polarization at input to the highly nonlinear fiber 134. On the other hand, when an optical pulse the short pulse light 320 input to the highly nonlinear fiber 134 is in a state of being emitted, the polarization of the combined light 330 rotates 90 degrees from the polarization at input to the highly nonlinear fiber 134.

From the light that has passed through the highly nonlinear fiber 134, the polarizer 135 transmits only the component of the polarization parallel to the Y axis of the figure. As a result, from the combined light 330 that has passed through the highly nonlinear fiber 134, only the component of which polarization is not rotated passes through the polarizer 135, and becomes pulse light 340. Thus, the continuous light 310 can be clipped according to the variation of emission intensity of the short pulse light 320, and the pulse light 340 can be generated from the continuous light 310.

The short pulse light 320 has periodic periods of no-emission, and during the periods of no-emission, the continuous light 310 is not clipped. Thus, the portion of the pulse light 340 corresponding to the periods of no-emission of the short pulse light 320 is the continuous light 310 output as it is, and thus becomes flat. As a result, the pulse light 340 comes to be flat-top optical pulses.

Figure 4:
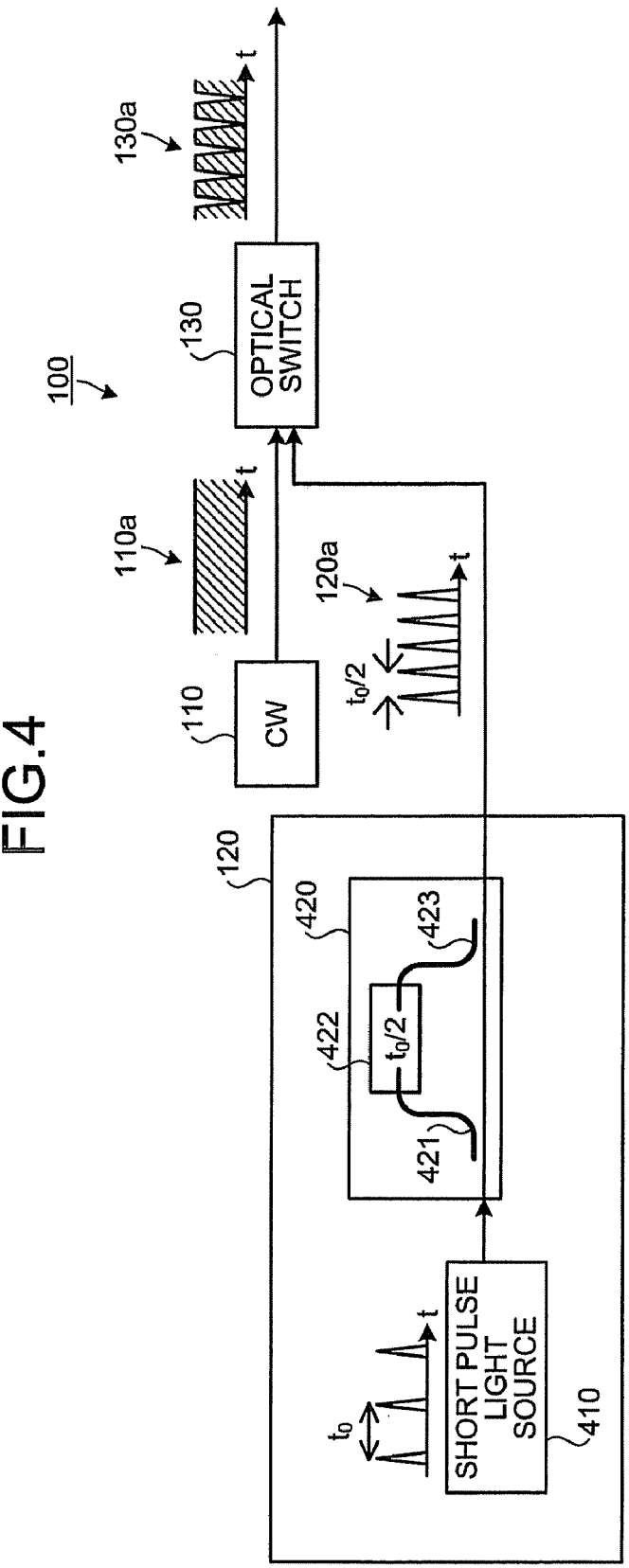
FIG. 4 is a block diagram of a first example of a specific configuration of a control pulse light oscillator.

FIG. 4 is a block diagram of a first example of a specific configuration of the control pulse light oscillator. In FIG. 4, elements similar to those depicted in FIG. 1 are assigned the same corresponding signs, and explanation therefor is omitted. As depicted in FIG. 4, the control pulse light oscillator 120 of the optical pulse generating device 100 according to the first embodiment includes, for example, a short pulse light source 410 and a time-division-multiplexing (TDM) unit 420. The short pulse light source 410 is an oscillating unit that oscillates a short pulse light of cycle $t_0$.

The short pulse light source 410 outputs the oscillated short pulse light to the TDM unit 420. The short pulse light source 410 is configured by, for example, a CW light source and an intensity modulator such as a lithium niobate ($LiNbO_3$) modulator and an electroabsorption (EA) modulator. Alternatively, the short pulse light source 410 may be configured by a mode-locked semiconductor laser or a mode-locked fiber laser.

The TDM unit 420 is a time-division-multiplexing unit that branches the short pulse light output from the short pulse light source 410, and combines the branched short pulse lights to be shifted temporally relative to each other. More specifically, the TDM unit 420 includes a branch unit 421, a delay unit 422, and a combining unit 423. The branch unit 421 branches and outputs the short pulse light output from the short pulse light source 410, to the delay unit 422 and the combining unit 423, respectively.

The delay unit 422 delays the short pulse light output from the branch unit 421 by half a cycle $t_0/2$, and outputs the delayed short pulse light to the combining unit 423. The combining unit 423 combines the short pulse light output from the branch unit 421 and the short pulse light output from the delay unit 422, and outputs the combined short pulse light to the optical switch 130. As indicated by the waveform 120a, the short pulse light output from the pulse generating unit has a cycle of $t_0/2$, which is half that of the short pulse light oscillated by the short pulse light source 410.

Here, a configuration is explained in which the number of time-division-multiplexing of the TDM unit 420 is two and the frequency of the short pulse light oscillated by the short pulse light source 410 is doubled. However, the number of multiplexing of the TDM unit 420 can be increased, for example, by further time-division multiplexing the time-division multiplexed short pulse light.

Thus, the frequency of the short pulse light oscillated by the short pulse light source 410 can be increased by 4 times, 8 times, . . . . On the other hand, if the short pulse light source 410 can oscillate a sufficiently fast short pulse light, the TDM unit 420 may be omitted and the short pulse light oscillated by the short pulse light source 410 may be output to the optical switch 130.

Figure 5:
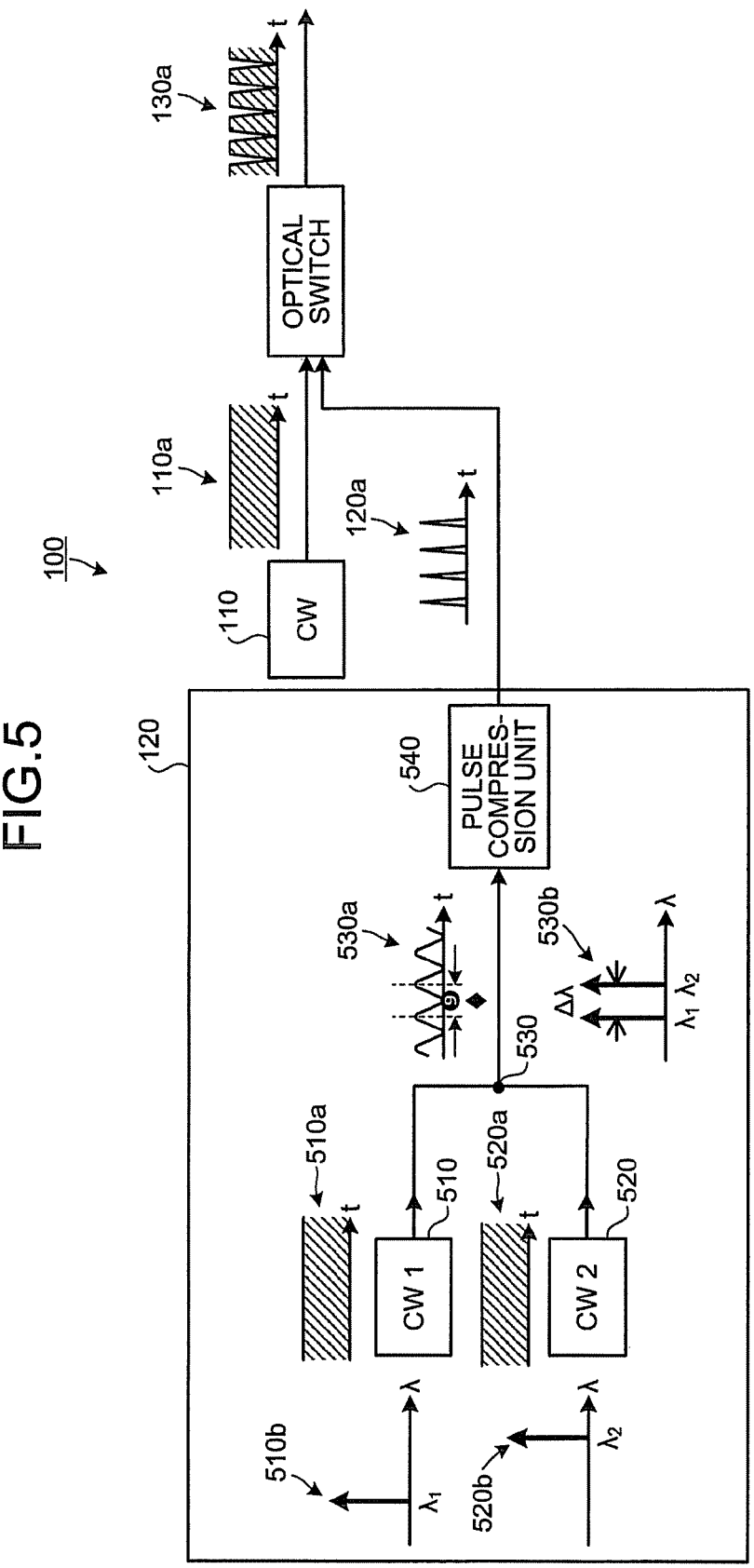
FIG. 5 is a block diagram of a second example of a specific configuration of the control pulse light oscillator.

FIG. 5 is a block diagram of a second example of a specific configuration of the control pulse light oscillator. In FIG. 5, elements similar to those depicted in FIG. 1 are assigned the same corresponding signs, and explanation therefor is omitted. As depicted in FIG. 5, the control pulse light oscillator 120 includes, for example, a light source 510, a light source 520, a combining unit 530, and a pulse compression unit 540. The light source 510 and the light source 520 oscillate continuous light of different wavelengths λ1 and λ2 (λ1<λ2), respectively.

The light source 510 and the light source 520 respectively output the oscillated continuous light to the combining unit 530. A waveform 510a and a waveform 520a represent the waveforms of the continuous light output from the light source 510 and the light source 520, respectively. An optical spectrum 510b and an optical spectrum 520b represent the optical spectra of the continuous light output from the light source 510 and the light source 520, respectively.

The combining unit 530 combines the continuous light output from the light source 510 and the light source 520. The combining unit 530 outputs the combined continuous light to the pulse compression unit 540. A waveform 530a represents the waveform of the combined light output from the combining unit 530. An optical spectrum 530b represents the optical spectrum of the combined light output from the combining unit 530.

As indicated by the waveform 530a and the optical spectrum 530b, the combined light output from the combining unit 530 is a sine wave (a beat signal) that includes a component of wavelength λ1 and a component of wavelength λ2. The relationship between the difference Δλ of the wavelengths λ1 and λ2 and the time cycle $t_0$ of the obtained sine wave is expressed by equation (6) below.

In equation (6), c represents the speed of light and f represents the frequency of light. The speed c of light and the frequency f are associated with the wavelength λ by equation (7) below. The pulse compression unit 540 performs pulse compression on the combined light output from the combining unit 530. The pulse compression unit 540 outputs the pulse-compressed light to the optical switch 130. As indicated by the waveform 120a, the light that has been pulse-compressed by the pulse compression unit 540 becomes the short pulse light.

$$\Delta t = \frac{c}{f^2 \times \Delta \lambda} \qquad (6)$$

$$c = f \times \lambda \qquad (7)$$

Figure 6:
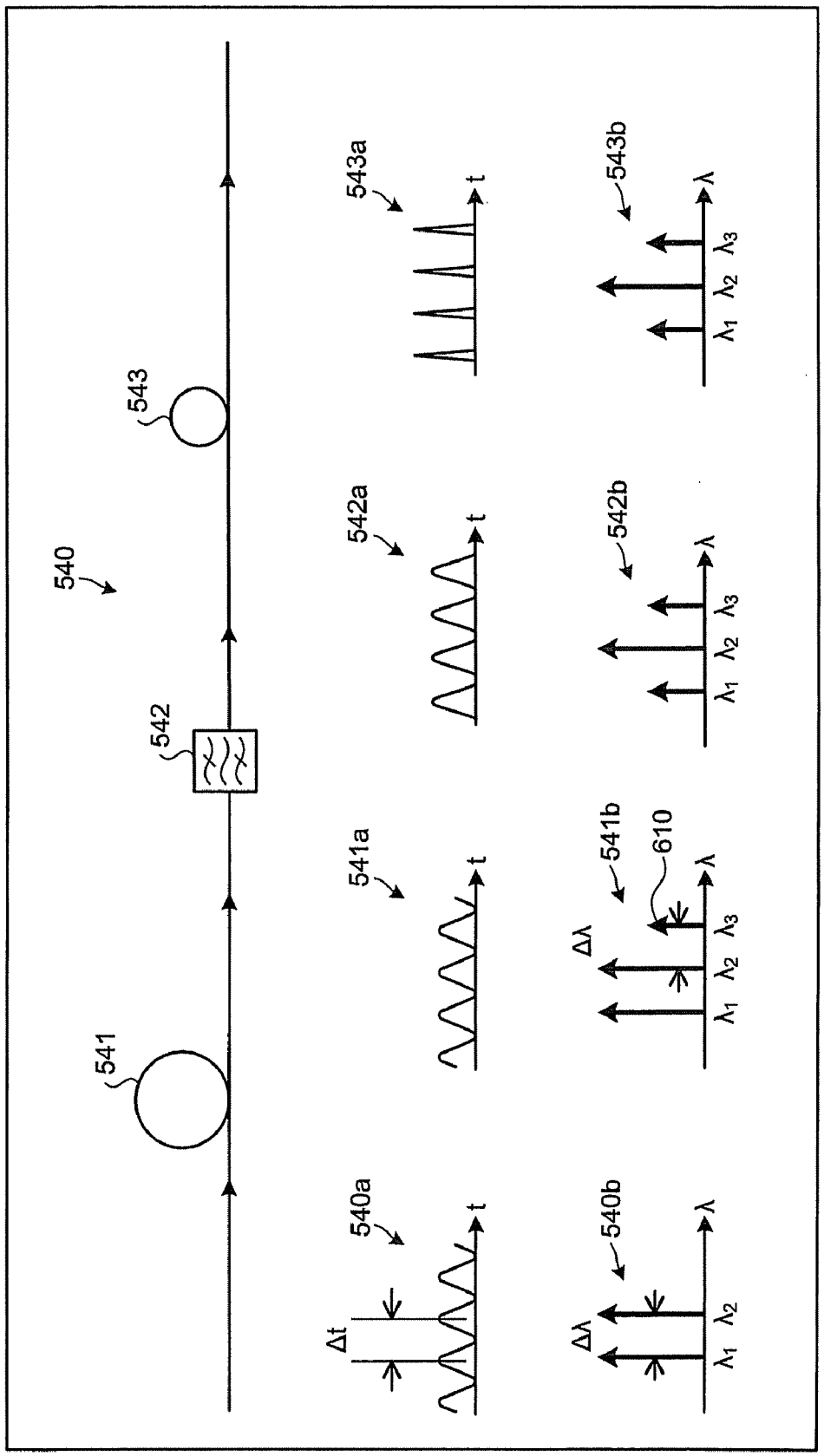
FIG. 6 is a block diagram of an example of a specific configuration of a pulse compression unit.

FIG. 6 is a block diagram of an example of a specific configuration of the pulse compression unit. As depicted in FIG. 6, the pulse compression unit 540 (see FIG. 5) includes a highly nonlinear fiber 541, a bandpass filter 542, and a single mode fiber 543. The highly nonlinear fiber 541 transmits and outputs the combined light (waveform 540a, optical spectrum 540b) output from the combining unit 530 as a sine wave (see FIG. 5), to the bandpass filter 542.

A waveform 541a and an optical spectrum 541b respectively represent the waveform and the optical spectrum of the combined light that has passed through the highly nonlinear fiber 541. As indicated by the optical spectrum 541b, the light that has passed through the highly nonlinear fiber 541 includes an idler 610 that is generated due to four-wave mixing by the highly nonlinear fiber 541. The wavelength λ3 of the idler 610 is symmetric to the wavelength λ1 with respect to wavelength λ2. The wavelength λ3 of the idler 610 is λ2+Δλ, where Δλ is the difference between the wavelengths λ1 and λ2.

The bandpass filter 542 transmits, from the combined light (waveform 541a, optical spectrum 541b) output from the highly nonlinear fiber 541, only the components of a band with a center wavelength of λ2 and outputs the transmitted components to the single mode fiber 543. A waveform 542a and an optical spectrum 542b respectively represent the waveform and the optical spectrum of the light that has passed through the bandpass filter 542. The optical spectrum 542b passed through the bandpass filter 542 has a symmetric shape about the wavelength λ2.

The single mode fiber 543 compensates the SPM, which is caused during transmission through the highly nonlinear fiber 541, of the light output from the bandpass filter 542 (waveform 542a, optical spectrum 542b). A waveform 543a and an optical spectrum 543b respectively represent the waveform and the optical spectrum of the light that has passed through the single mode fiber 543. As indicated by the waveform 543a, the light that has passed through the single mode fiber 543 is pulse-compressed and becomes the short pulse light due to the compensation of the SPM.

For the control pulse light oscillator 120 depicted in FIGS. 4 to 6, for example, a technology disclosed in "Generation of 160-GHz sub-picosecond in-phase pulse train from optical beat signal," by Inoue, T., et al, Fitel Photonics Laboratory.

Figure 7:
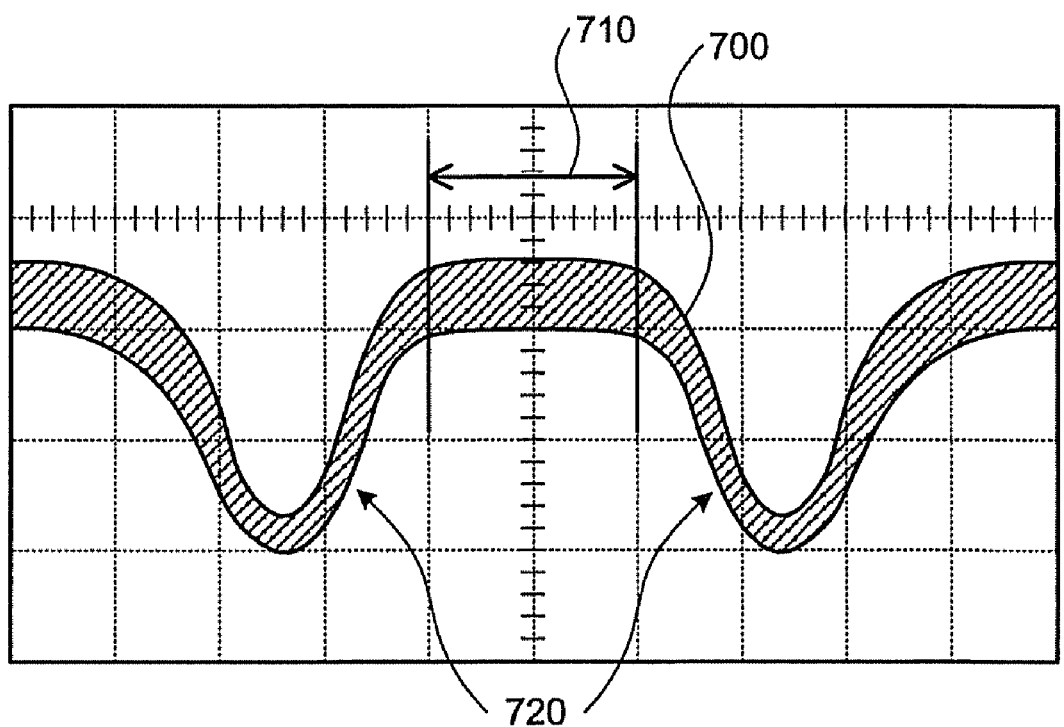
FIG. 7 is a wave diagram of a generated flat-top optical pulse.

FIG. 7 is a wave diagram of a generated flat-top optical pulse. In FIG. 7, a waveform 700 represents the waveform of the flat-top optical pulse output from the optical switch 130. A sign 710 indicates a flat-top portion of the optical pulse. The flat-top portion 710 is formed according to the portions of the input short pulse light when no optical pulse is emitted.

In other words, the flat-top portion 710 is a portion of the continuous light that is input to the optical switch 130 and output therefrom without being clipped. Thus, the flat-top portion 710 is not affected by the noise of the short pulse light. As a result, the flat-top portion 710 does not include noise even when the short pulse light includes noise.

A sign 720 indicates a clipped portion of the optical pulse. The clipped portion 720 is formed according to the optical pulses in the short pulse light input to the optical switch 130. Thus, the clipped portion 720 is affected by the noise of the short pulse light, and thus includes noise when the short pulse light includes noise, however, the effect is limited since the clipped portion 720 is a valley of the optical pulse.

As described above, the optical pulse generating device 100 according to the first embodiment can generate pulse light by clipping the continuous light by the optical switch 130. Since the optical pulses in the generated pulse light are components of the continuous light itself, the optical pulses in the generated pulse light do not include noise even when the optical pulses in the control pulse light include noise.

Further, the generated pulse light can be flat-top optical pulses by using short pulse light as the control pulse light input to the optical switch 130. Furthermore, since the frequency of the generated pulse light is determined by the frequency of the input control pulse light, optical pulses of any bit rate can be generated by adjusting the control pulse light.

Further, fast optical pulse light can be generated by oscillating fast, short pulse light by the control pulse light oscillator 120. Furthermore, insertion loss can be reduced since the insertion loss for generating the flat-top optical pulses includes only the loss of the continuous light corresponding to the pulses in the short pulse light.

FIG. 8 is a block diagram depicting a configuration of an optical pulse generating device according to a second embodiment. In FIG. 8, elements similar to those depicted in FIG. 1 are assigned the same corresponding signs, and explanation therefor is omitted. In addition to the elements of the optical pulse generating device 100 depicted in FIG. 1, an optical pulse generating device 100 according to the second embodiment includes a branch unit 810, a delay unit 820, and an optical switch 830.

The branch unit 810 branches the short pulse light output from the control pulse light oscillator 120. The branch unit 810 outputs the branched short pulse light to the optical switch 130 and the delay unit 820, respectively. The optical switch 130 generates pulse light from the continuous light output from the light source 110 and the short pulse light output from the delay unit 820, and outputs the generated pulse light to the optical switch 830.

The delay unit 820 delays the short pulse light output from the branch unit 810 by a short time interval Δt, and outputs the delayed short pulse light to the optical switch 830. A waveform 820a represents the waveform of the short pulse light output from the delay unit 820. As indicated by the waveform 820a and the waveform 130a, the optical pulses of the short pulse light output from the delay unit 820 are shifted by the short time interval Δt from the clipped portion of the pulse light output from the optical switch 130.

The optical switch 830 is a reshaping unit that reshapes the pulse light output from the optical switch 130 by clipping the component corresponding to the variation of emission intensity of the short pulse light output from the delay unit 820. The optical switch 830 is, for example, an optical Kerr switch that has a similar configuration to that of the optical switch 130 (see FIG. 2).

Here, since the optical switch 830 clips the pulse light according to short pulse light that is shifted by the short time interval Δt relative to the clipped portion of the pulse light output from the optical switch 130, the clipped portion (see the sign 720 of FIG. 7) of the optical pulse becomes wider. Thus, the optical pulse can be reshaped such that the flat-top portion (see the sign 710 of FIG. 7) of the optical pulse becomes narrower.

FIG. 9 is a block diagram of a variation of the optical pulse generating device according to the second embodiment. In FIG. 9, elements similar to those depicted in FIG. 8 are assigned the same corresponding signs, and explanation therefor is omitted. As depicted in FIG. 9, the optical pulse generating device 100 according to the second embodiment may include the delay unit 820 disposed between the optical switch 130 and the optical switch 830.

A waveform 810a represents the waveform of the short pulse light output from the branch unit 810. As indicated by the waveform 810a and a waveform 820a, the optical pulses of the short pulse light output from the branch unit 810 are shifted by the short time interval Δt relative to the clipped portion of the pulse light output from the delay unit 820. Thus, similar to the configuration depicted in FIG. 8, the flat-top portion of the optical pulses output from the delay unit 820 can be reshaped to be narrower by the optical switch 830.

Here, a configuration is explained in which the delay unit 820 delays the short pulse light output from the branch unit 810 by the short time interval Δt. Alternatively, the delay unit 820 may delay the short pulse light output from the branch unit 810 by half a cycle. Thus, the centers of the flat-top portion of the optical pulses output from the optical switch 130 are clipped by the optical switch 830, thereby doubling the frequency of the optical pulse.

Thus, fast pulse light can be generated without disposal of, for example, the TDM unit 420 depicted in FIG. 2. By adjusting the delay time by which the short pulse light is delayed by delay unit 820 as described above, the pulse light output from the optical switch 130 can be reshaped, thereby expanding the range of freedom in reshaping the waveform of the generated pulse light. The delay unit 820 may be disposed between both, the optical switch 130 and the optical switch 830, and the branch unit 810 and the optical switch 830.

Here, a two-stage configuration is employed in which the optical switch 830 is provided downstream of the optical switch 130. Alternatively, a configuration with three stages or more may be employed in which another optical switch is provided downstream of the optical switch 830. In this case, by adjusting the delay amount of the short pulse light input to the additional optical switch, the flat-top portion of the optical pulse output from the optical switch 830 may be reshaped to be narrower, or the frequency of the pulse light output from the optical switch 830 may be increased.

As described above, the optical pulse generating device 100 according to the second embodiment not only has similar advantages to those of the optical pulse generating device 100 according to the first embodiment, but also can reshape the pulse light generated by the optical switch 130 by the disposal of the optical switch 830 downstream of the optical switch 130 and the input of the short pulse light for which delay has been adjusted, to the optical switch 830.

FIG. 10 is a block diagram depicting a configuration of an optical pulse generating device according to a third embodiment. In FIG. 10, elements similar to those depicted in FIG. 1 are assigned the same corresponding signs, and explanation therefor is omitted. As depicted in FIG. 10, an optical switch 130 according to the third embodiment includes an isolator 1010, a circulator 1020, an isolator 1030, an NOLM 1040, a wavelength filter 1050, and a wavelength filter 1060.

The isolator 1010 transmits and outputs the continuous light output from the light source 110, to the circulator 1020. The isolator 1010 also blocks the light output from the circulator 1020, thereby preventing the light from returning to the light source 110. The circulator 1020 outputs the continuous light output from the isolator 1010, to the NOLM 1040.

The circulator 1020 also outputs the combined light output from the NOLM 1040, to the wavelength filter 1050. The isolator 1030 outputs the short pulse light output from the control pulse light oscillator 120, to the NOLM 1040. The isolator 1030 also blocks the light output from the NOLM 1040, thereby preventing the light from returning to the control pulse light oscillator 120.

The NOLM 1040 includes a polarization controller 1041, an optical coupler 1042, a ring waveguide 1043, a polarization controller 1044, an optical coupler 1045, and a highly nonlinear fiber 1046. The polarization controller 1041 controls the continuous light output from the circulator 1020 to have a given polarization. The polarization controller 1041 outputs the continuous light of which polarization is controlled, to the optical coupler 1042.

The optical coupler 1042 branches the continuous light output from the polarization controller 1041. The optical coupler 1042 is, for example, a 3 dB coupler that branches the continuous light at the ratio of 5:5. The optical coupler 1042 outputs the branches of continuous light to both ends of the ring waveguide 1043. The ring waveguide 1043 is an optical waveguide with both ends thereof connected to the optical coupler 1042. The ring waveguide 1043 circulates the branches of the continuous light output from the optical coupler 1042 in opposite directions.

The branches of light circulating in the ring waveguide 1043 return to and are combined by the optical coupler 1042. The combined light is output to a first path to the circulator 1020 or a second path to the wavelength filter 1060, according to the phase difference between the branches of light combined by the optical coupler 1042.

The polarization controller 1044 controls the short pulse light output from the control pulse light oscillator 120 to have the given polarization, and outputs the short pulse light of which polarization is controlled, to the optical coupler 1045. The optical coupler 1045 combines the short pulse light output from the polarization controller 1044 with one of the branches of the continuous light circulating in the ring waveguide 1043. In this example, the optical coupler 1045 combines the short pulse light with the continuous light circulating in the ring waveguide 1043 in a clockwise direction.

The highly nonlinear fiber 1046 is provided on at least a part of the ring waveguide 1043, and transmits the branches of light circulating in the ring waveguide 1043. The continuous light circulating in the ring waveguide 1043 in a clockwise direction is combined with the short pulse light at the optical coupler 1045, and is phase-modulated during transmission through the highly nonlinear fiber 1046 according to the variation of emission intensity of the short pulse light.

Thus, the phase difference between the branches of light combined by the optical coupler 1042 changes according to the variation of emission intensity of the short pulse light, and the combined light is output to the first path to the circulator 1020 or the second path to the wavelength filter 1060. For example, when an optical pulse of the short pulse light is being emitted, the phase difference between the branches of light becomes π and the combined light is output to the wavelength filter 1060. When no optical pulse of the short pulse light is being emitted, the phase difference between the branches of light becomes 0 and the combined light is output to the circulator 1020.

The wavelength filter 1060 transmits the component of wavelength λs of the combined light output from the optical coupler 1042, and blocks the component of wavelength λc. Thus, the component of the short pulse light is eliminated from the combined light output from the optical coupler 1042, and the component of the continuous light is extracted. A waveform 1060a represents the waveform of the light that has passed through the wavelength filter 1060. As indicated by the waveform 1060a, the light that has passed through the wavelength filter 1060 has a waveform corresponding to the short pulse light input to the optical switch 130 (waveform 120a).

The combined light combined by the optical coupler 1042 and output to the circulator 1020 is output to the wavelength filter 1050. The wavelength filter 1050 transmits the component of wavelength λs of the combined light output from the circulator 1020, and blocks the component of wavelength λc. Thus, the component corresponding to the short pulse light is eliminated from the combined light output from the circulator 1020, and the component corresponding to the continuous light is extracted. A waveform 1050a represents the waveform of the light that has passed through the wavelength filter 1050.

As indicated by the waveform 1050a, the light that has passed through the wavelength filter 1050 becomes pulse light that is the continuous light clipped according to the variation of emission intensity of the short pulse light input to the optical switch 130. The wavelength filter 1050 outputs the generated pulse light to a destination external to the optical pulse generating device 100. For enhancing the flexibility of polarization control, a polarization controller 1047 may be provided on the ring waveguide 1043. In this example, the wavelength filter 1060 may be omitted since the optical pulses output from the wavelength filter 1060 are not necessary.

As described above, the optical pulse generating device 100 according to the third embodiment has similar advantages to those of the optical pulse generating device 100 according to the first embodiment by forming the optical switch 130 with the NOLM 1040, adopted as an NOLM switch, in place of the optical Kerr switch according to the first embodiment. Pulse light that is the continuous light clipped according to the variation of emission intensity of the short pulse light can be obtained by transmitting the light output from the first path, to which the combined light combined by the optical coupler 1042 is output when an optical pulse of the short pulse light is being emitted, to an external destination.

FIG. 11 is a block diagram depicting a configuration of an optical pulse generating device according to a fourth embodiment. In each of the embodiments described above, a configuration is explained in which pulse light is generated having flat-top optical pulses by using a short pulse light. However, an optical pulse generating device 100 according to the fourth embodiment generates pulse light having optical pulses of quadratic shape. In FIG. 11, elements similar to those depicted in FIG. 1 are assigned the same corresponding signs, and explanation therefor is omitted.

As depicted in FIG. 11, the optical pulse generating device 100 according to the fourth embodiment can output pulse light having optical pulses of quadratic shape (see the waveform 130a) from the optical switch 130 by adjusting the frequency and the pulse width of the control pulse light oscillated by the control pulse light oscillator 120 (see the waveform 120a). More specifically, the period of no-emission of the control pulse light is made to be substantially 0 by making the pulse interval of the control pulse light oscillated by the control pulse light oscillator 120 wider.

FIG. 12 is a wave diagram of generated pulse light having optical pulses of quadratic shape. In FIG. 12, the horizontal axis represents time [ps], while the vertical axis represents intensity [a.u.]. A waveform 1210 depicted by the solid line represents the waveform of the pulse light output from the optical switch 130 (corresponding to the waveform 130a depicted in FIG. 11) when the frequency of the control pulse light oscillated by the control pulse light oscillator 120 is 160 GHz (the pulse interval is 6.25 ps), the optical pulse has a Gaussian shape, and the pulse width is 2.3 ps.

A dotted line 1220 represents a result of a quadratic function fitting for the valley of the waveform 1210. As depicted by the waveform 1210 and the dotted line 1220, the waveform of the optical pulse of the pulse light output from the optical switch 130 has a substantially quadratic shape. Although the calculation result does not include the rotation of the polarization by the optical switch 13, the waveform after the switching by the optical switch 130 does not significantly change. Thus, pulse light having optical pulses of a substantially quadratic shape can be generated.

As described above, the optical pulse generating device 100 according to the fourth embodiment can generate pulse light by clipping the continuous light by the optical switch 130. Further, pulse light having optical pulses of quadratic shape (parabolic pulse) can be generated by adjusting the frequency and the pulse width of the control pulse light input to the optical switch 130.

Further, since the frequency of the generated pulse light is determined by the frequency of the input control pulse light, pulse light having optical pulses of quadratic shape and an arbitral bit rate can be generated by adjusting the control pulse light. Furthermore, fast pulse light having optical pulses of quadratic shape can be generated by oscillating fast control pulse light by the control pulse light oscillator 120.

Figure 13:
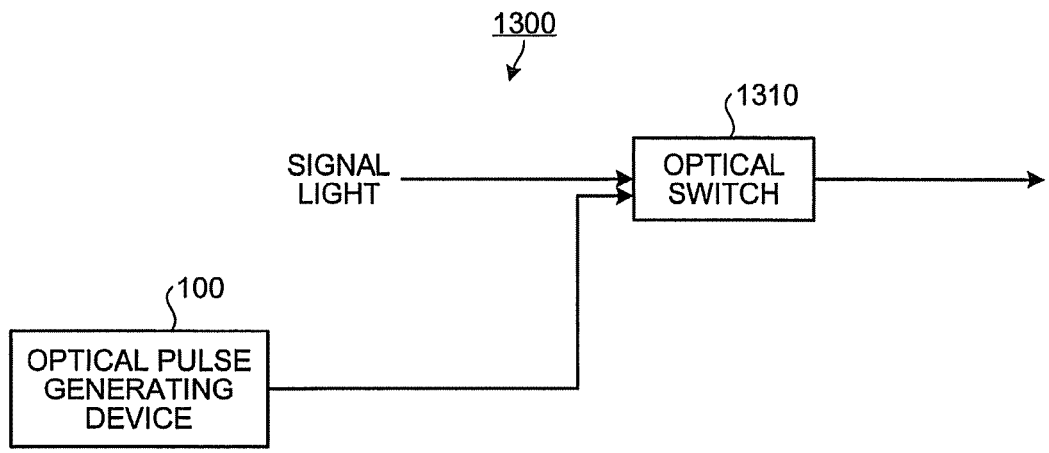
FIG. 13 is a block diagram depicting a configuration of an optical signal processing device according to a fifth embodiment.

FIG. 13 is a block diagram depicting a configuration of an optical signal processing device according to a fifth embodiment. As depicted in FIG. 13, an optical signal processing device 1300 according to the fifth embodiment includes the optical pulse generating device 100 according to any of the first to the third embodiments described above, and an optical switch 1310. The configuration of the optical pulse generating device 100 is explained in the first to the third embodiments, and explanation therefor is omitted. The optical pulse generating device 100 generates, and outputs pulse light having flat-top optical pulses to the optical switch 1310.

The optical switch 1310 receives the pulse light output from the optical pulse generating device 100 and signal light of a wavelength different from the pulse light. Here, it is assumed that the wavelength of the continuous light oscillated by the light source 110 is $\lambda s$, and the wavelength of the control pulse light oscillated by the control pulse light oscillator 120 is $\lambda c$ ($\lambda s < \lambda c$). The optical switch 1310 switches the input signal light according to the emission intensity of the pulse light output from the optical pulse generating device 100, thereby performing optical signal processing such as reshaping of the signal light and ON/OFF switching.

Figure 14:
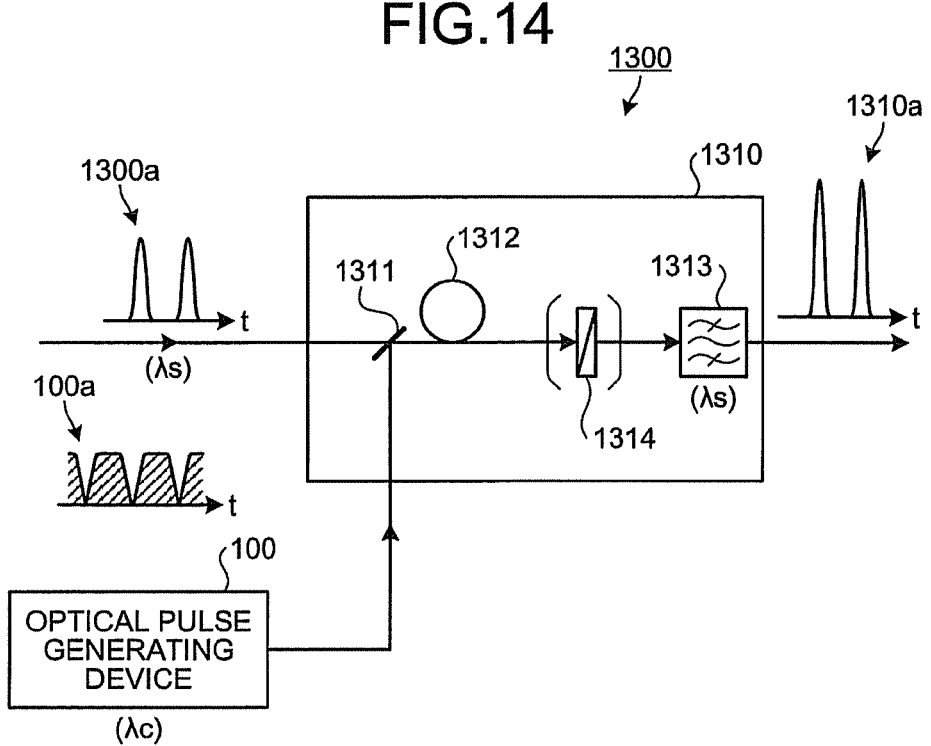
FIG. 14 is a block diagram of a first example of a specific configuration of an optical switch.

FIG. 14 is a block diagram of a first example of a specific configuration of the optical switch. In FIG. 14, elements similar to those depicted in FIG. 13 are assigned the same corresponding signs, and explanation therefor is omitted. As depicted in FIG. 14, the optical switch 130 of the optical signal processing device 1300 according to the fifth embodiment is, for example, a parametric amplification, switch that includes a combining unit 1311, a highly nonlinear fiber 1312, and a wavelength filter 1313.

A waveform 1300a represents the waveform of the signal light input to the optical switch 130. The combining unit 1311 combines the input signal light and the pulse light output from the optical pulse generating device 100 (see the waveform 100a). The combining unit 1311 outputs the combined light including the signal light and the pulse light to the highly nonlinear fiber 1312. The highly nonlinear fiber 1312 transmits and outputs the combined light output from the combining unit 1311, to the wavelength filter 1313.

The wavelength filter 1313 transmits the component of wavelength $\lambda s$ of the combined light output from the highly nonlinear fiber 1312, and blocks the component of the wavelength $\lambda c$. Thus, the component corresponding to the pulse light is eliminated from the combined light output from the highly nonlinear fiber 1312, and the component corresponding to the signal light is extracted. The signal light output from the wavelength filter 1313 is subjected to uniform parametric amplification due to the nonlinear optical effect of the highly nonlinear fiber 1312.

Here, the component corresponding to the signal light is extracted from the combined light output from the highly nonlinear fiber 1312 by providing the wavelength filter 1313, however, a polarizer 1314 may be further provided.

Figure 15:
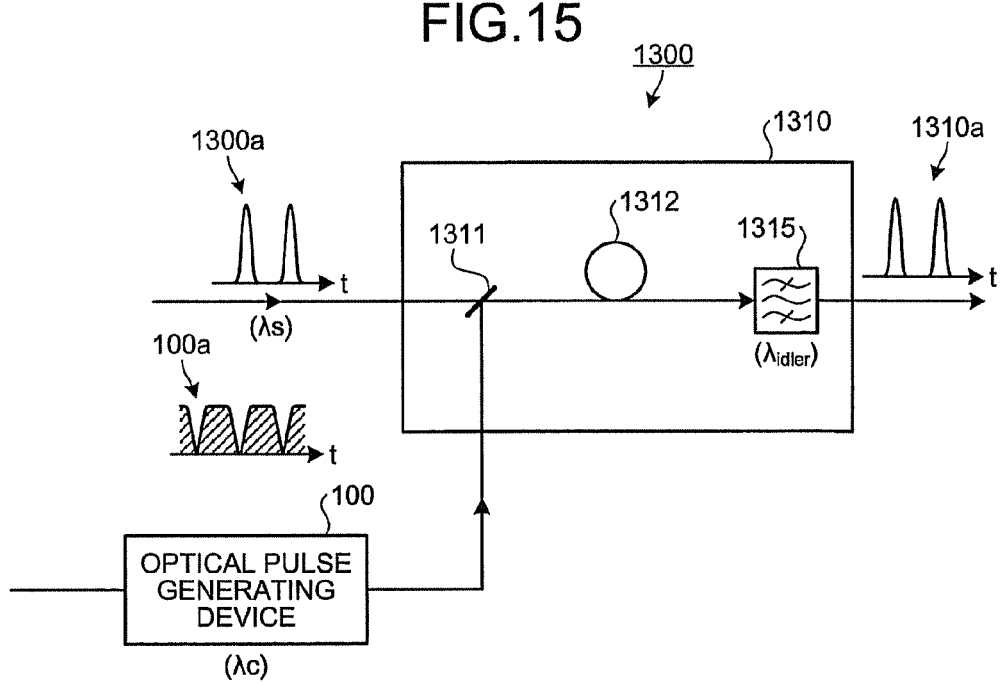
FIG. 15 is a block diagram of a second example of a specific configuration of the optical switch.

FIG. 15 is a block diagram of a second example of a specific configuration of the optical switch. In FIG. 15, elements similar to those depicted in FIG. 14 are assigned the same corresponding signs, and explanation therefor is omitted. As depicted in FIG. 15, the optical switch 1310 of the optical signal processing device 1300 according to the fifth embodiment is, for example, a four-wave mixing wavelength converting switch that includes the combining unit 1311, the highly nonlinear fiber 1312, and a wavelength filter 1315. The highly nonlinear fiber 1312 transmits and outputs the combined light output from the combining unit 1311, to the wavelength filter 1315.

The wavelength filter 1315 transmits the component of the wavelength $\lambda_{idler}$ of the combined light output from the highly nonlinear fiber 1312, and blocks the components of the wavelengths $\lambda s$ and $\lambda c$. The wavelength $\lambda_{idler}$ is the wavelength of the idler generated in the highly nonlinear fiber 1312. The wavelength $\lambda_{idler}$ is $\lambda c + \Delta\lambda$, where $\Delta\lambda$ is the difference between the wavelengths $\lambda s$ and $\lambda c$.

Thus, the components corresponding to the signal light and the optical pulse are eliminated from the combined light output from the highly nonlinear fiber 1312, and the component corresponding to the idler generated in the highly nonlinear fiber 1312 is extracted. The wavelength of the signal light output from the wavelength filter 1315 is the wavelength $\lambda_{idler}$ of the idler generated in the highly nonlinear fiber 1312.

The wavelength $\lambda_{idler}$ of the idler generated in the highly nonlinear fiber 1312 can be adjusted by changing the wavelength $\lambda c$ of the pulse light input to the optical switch 1310. The wavelength $\lambda c$ can be adjusted by the wavelength of the continuous light of the optical pulse generating device 100. Thus, the wavelength $\lambda s$ of the signal light can be converted to an arbitrary wavelength by using a highly nonlinear fiber having the zero-dispersion wavelength $\lambda_0$ adjusted to $\lambda c$.

Figure 16:
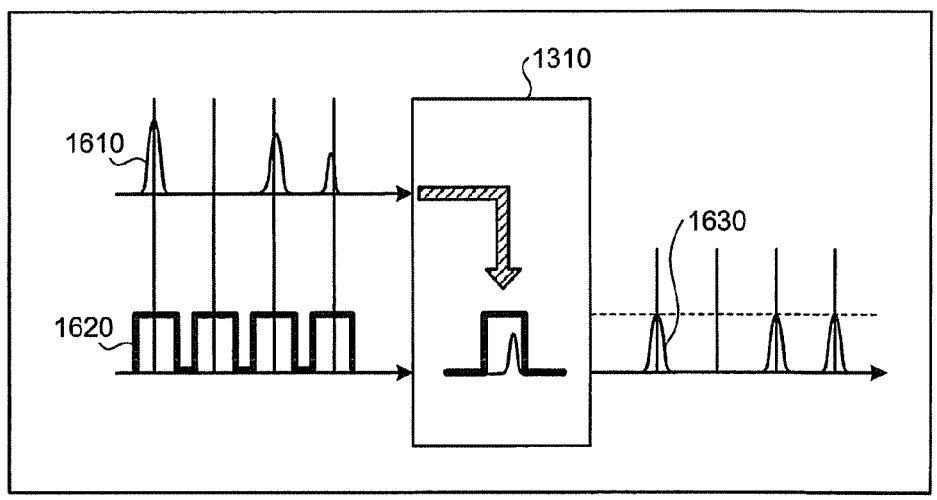
FIG. 16 is a diagram for explaining the operation of waveform reshaping of the optical signal processing device.

FIG. 16 is a diagram for explaining the operation of waveform reshaping of the optical signal processing device. In FIG. 16, a signal light 1610 represents signal light input to the optical signal processing device 1300. Pulse light 1620 represents the pulse light having flat-top optical pulses output from the optical pulse generating device 100. In the optical signal processing device 1300 depicted in FIGS. 13 to 15, the flat-top optical pulses of the pulse light 1620 can be used as the control pulse light for pumping the signal light 1610.

Figure 18:
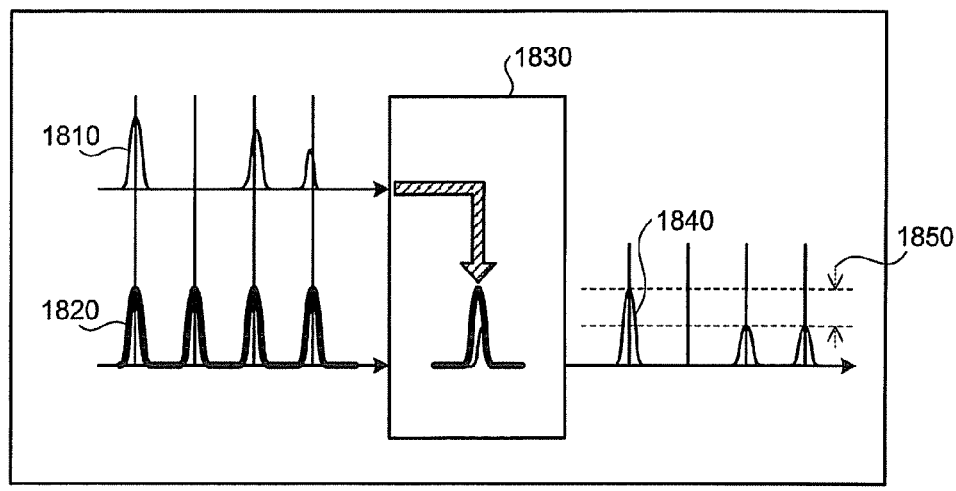
FIG. 18 is a diagram for explaining the operation of a conventional optical switch.

Thus, if the signal light 1610 includes phase noise and the timing thereof deviates from the timing of the pulse light 1620, the timing deviation can be covered by the flat-top shape of the optical pulses in the pulse light 1620. Thus, the signal light 1610 can be uniformly amplified, and no intensity noise is generated in an output signal 1630 (see a sign 1850 of FIG. 18).

Thus, the optical signal processing device 1300 according to the fifth embodiment generates fast, low-noise pulse light having flat-top optical pulses by the optical pulse generating device 100 according to any of the first to the third embodiments, and performs the switching using the generated pulse light, thereby achieving fast and accurate switching.

Figure 17:
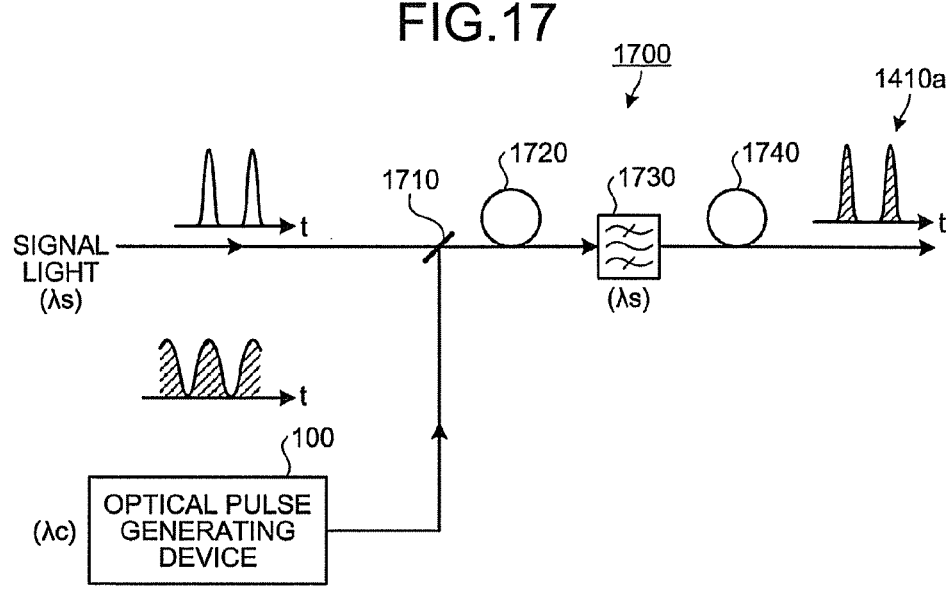
FIG. 17 is a block diagram depicting a configuration of an optical signal processing device according to a sixth embodiment.

FIG. 17 is a block diagram depicting a configuration of an optical signal processing device according to a sixth embodiment. As depicted in FIG. 17, an optical signal processing device 1700 according to the sixth embodiment is a Fourier transform processing device that includes the optical pulse generating device 100 according to the fourth embodiment described above, a combining unit 1710, a highly nonlinear fiber 1720, a wavelength filter 1730, and a dispersion medium 1740.

The optical pulse generating device 100 generates and outputs the pulse light having optical pulses of quadratic shape to the combining unit, 1710. The combining unit 1710 receives the pulse light output from the optical pulse generating device 100 and signal light. The combining unit 1710 combines the input signal light and the pulse light output from the optical pulse generating device 100, and outputs the combined light to the highly nonlinear fiber 1720.

The highly nonlinear fiber 1720 transmits and outputs the combined light output from the combining unit 1710, to the wavelength filter 1730. The combined light that has passed through the highly nonlinear fiber 1720 is phase-modulated by XPM generated in the highly nonlinear fiber 1720. The wavelength filter 1730 transmits only the component of the wavelength λs of the combined light output from the highly nonlinear fiber 1720. The wavelength filter 1730 outputs the transmitted light to the dispersion medium 1740.

The dispersion medium 1740 transmits and outputs the light output from the wavelength filter 1730, to a destination external to the optical signal processing device 1700. The light that has been phase-modulated by the highly nonlinear fiber 1720 and transmitted through the dispersion medium 1740 is converted to the optical spectrum that is Fourier transform components of the signal light input to the optical signal processing device 1700. Thus, the optical signal processing device 1700 can perform fast Fourier transform on the input signal light by all-optical signal processing without electrical processing.

Here, the optical pulse generating device 100 according to the fourth embodiment is applied to the Fourier transform processing device. However, since the optical pulse generating device 100 according to the fourth embodiment can generate fast pulse light having optical pulses of quadratic shape by all-optical processing, the optical pulse generating device 100 can be applied to a broad-band supercontinuum, high-quality pulse compression, etc.

As described above, the optical signal processing device 1700 according to the sixth embodiment generates fast pulse light having optical pulses of quadratic shape by the optical pulse generating device 100 according to the fourth embodiment described above, and performs Fourier transform by the generated pulse light. Thus, the optical signal processing device 1700 can perform fast Fourier transform on fast signal light by all-optical signal processing without reducing the bit rate.

As described above, the optical pulse generating device and the optical signal processing device disclosed herein can generate fast, low-noise pulse light.

The above configuration can generate pulse light by clipping the continuous light. Since the optical pulses in the generated pulse light are components of the continuous light itself, the optical pulses in the generated pulse light do not include noise even when the optical pulses in the control pulse light include noise. Furthermore, since the frequency of the generated pulse light is determined by the frequency of the input control pulse light, fast pulse light can be generated by inputting fast control pulse light.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical pulse generating device comprising:
    a continuous light source to output continuous light;
    a pulse light source to output control pulse light that includes periodic pulses of light;
    a generator to generate pulse light from the continuous light by clipping the continuous light according to a variation of emission intensity of the control pulse light;
    a branch unit that branches a part of the control pulse light output from the pulse light source;
    a reshaping unit that reshapes the pulse light generated by the generator by clipping the pulse light according to a variation of emission intensity of the part of the control pulse light branched by the branch unit, wherein the greater the emission intensity is, the more components of the optical pulse are clipped; and
    a delay unit that delays at least one among the pulse light and the control pulse light input to the reshaping unit.

2. The optical pulse generating device according to claims 1, wherein
    the generator includes:
        a first polarization controller that controls the continuous light output from the continuous light source to be a given polarization,
        a second polarization controller that controls the control pulse light output from the pulse light source to be a polarization shifted substantially 45 degrees from the given polarization,
        an optical fiber that transmits a combined light obtained by combining the continuous light output from the first polarization controller and the control pulse light output from the second polarization controller, and
        a polarizer that transmits, from the combined light output from the optical fiber, transmits a component of the given polarization and blocks components of other polarizations.

3. The optical pulse generating device according to claim 2, wherein the optical fiber is a nonlinear optical fiber.

4. The optical pulse generating device according to claim 1, wherein the generator is an optical switch that generates the pulse light by transmitting a component of the continuous light and blocking other components of the continuous light according to the variation of emission intensity of the control pulse light.

5. The optical pulse generating device according to claim 4, wherein
    the pulse light source outputs a short pulse light that includes periodic and instantaneous pulses of light as the control pulse light, and
    the optical switch generates pulse light having flat-top optical pulses by transmitting the component of the continuous light and blocking other components of the continuous light according to a variation of emission intensity of the short pulse light.

6. The optical pulse generating device according to claim 5, wherein
    the optical switch includes:
        an optical coupler that branches the continuous light into branches of light;
        a loop mirror that has a nonlinear optical effect, circulates the branches of light branched by the optical coupler in opposite directions, and causes the branches of light to be combined by the optical coupler; and
        a combiner that combines the control pulse light output from the pulse light source with one of the branches of light circulating in the loop mirror,
    the optical coupler outputs the combined branches of light to a first path when a pulse of the control pulse light is not being emitted, and outputs the combined branches of light to a second path when a pulse of the control pulse light is being emitted, and the optical switch transmits light output to the first path, and blocks light output to the second path.

7. The optical pulse generating device according to claim 1, wherein the pulse light source includes:

an oscillator that oscillates pulse light; and a time-division-multiplexer that branches the pulse light oscillated by the oscillator into branched pulses, and combines the branched pulses to be temporally shifted relative to each other, wherein light combined by the time-division-multiplexer is input to the generator as the control pulse light.

8. The optical pulse generating device according to claim 1, wherein the pulse light source includes:

two light sources that output continuous light of respectively different wavelengths;

a combiner that combines the continuous light output from the light sources, respectively; and a compressor that performs pulse compression on light that is combined and generated by the combiner, wherein light compressed by the compressor is input to the generator as the control pulse light.

9. The optical pulse generating device according to claim 1, wherein the generator generates pulse light having optical pulses of quadratic shape as the pulse light.

10. An optical signal processing device comprising:

an optical pulse generating device that includes:

a continuous light source to output continuous light, a pulse light source to output control pulse light that includes periodic pulses of light, and a generator that generates pulse light from the continuous light by clipping the continuous light according to a variation of emission intensity of the control pulse light; and a second optical switch to which the pulse light having flat-top optical pulses and generated by the generator of the optical pulse generating device and a signal light are input, and that performs a switching on the signal light according to the variation of emission intensity of the pulse light, wherein the generator includes:

a first polarization controller that controls the continuous light output from the continuous light source to be a given polarization, a second polarization controller that controls the control pulse light output from the pulse light source to be a polarization shifted substantially 45 degrees from the given polarization, an optical fiber that transmits a combined light obtained by combining the continuous light output from the first polarization controller and the control pulse light output from the second polarization controller, and a polarizer that transmits, from the combined light output from the optical fiber, transmits a component of the given polarization and blocks components of other polarizations.

11. An optical signal processing device that performs Fourier transform on an input signal light, comprising:

an optical pulse generating device that includes:

a continuous light source to output continuous light, a pulse light source to output control pulse light that includes periodic pulses of light, and a generator that generates pulse light from the continuous light by clipping the continuous light according to a variation of emission intensity of the control pulse light, the pulse light having optical pulses of quadratic shape;

a modulator to which the pulse light having optical pulses of quadratic shape and generated by the generator of the optical pulse generating device and the signal light are input, and that performs phase modulation on the signal light according to the variation of emission intensity of the pulse light; and a dispersion medium that transmits the signal light, wherein the generator includes:

a first polarization controller that controls the continuous light output from the continuous light source to be a given polarization, a second polarization controller that controls the control pulse light output from the pulse light source to be a polarization shifted substantially 45 degrees from the given polarization, an optical fiber that transmits a combined light obtained by combining the continuous light output from the first polarization controller and the control pulse light output from the second polarization controller, and a polarizer that transmits, from the combined light output from the optical fiber, transmits a component of the given polarization and blocks components of other polarizations.

* * * * *

UNITED STATES PATENT AND TRADEMARK OFFICE
CERTIFICATE OF CORRECTION

PATENT NO.       : 8,385,741 B2
APPLICATION NO.  : 12/732523
DATED            : February 26, 2013
INVENTOR(S)      : Ryou Okabe et al.

It is certified that error appears in the above-identified patent and that said Letters Patent is hereby corrected as shown below:

In the Claims

Column 18, Line 17, Claim 2, delete "claims" and insert --claim--, therefor.

Signed and Sealed this
Second Day of July, 2013

Teresa Stanek Rea
*Acting Director of the United States Patent and Trademark Office*